United States Patent [19]
Demick et al.

[11] Patent Number: 5,282,666
[45] Date of Patent: Feb. 1, 1994

[54] VEHICLE SEAT ASSEMBLY WITH INTEGRATED CHILD SEAT

[75] Inventors: Robert L. Demick, Eastpointe; Mark S. Milner, Farmington Hills, both of Mich.

[73] Assignee: Hoover Universal, Inc., Plymouth, Mich.

[21] Appl. No.: 827,403

[22] Filed: Jan. 29, 1992

[51] Int. Cl.⁵ .............................................. B60N 2/30
[52] U.S. Cl. ...................................... 297/237; 297/338
[58] Field of Search ...................... 297/284.7, 236, 237, 297/238, 240, 257, 338

[56] References Cited
U.S. PATENT DOCUMENTS
5,161,855 11/1992 Harmon ............................... 297/238

FOREIGN PATENT DOCUMENTS
59-156837 9/1984 Japan ..................................... 297/236

Primary Examiner—James R. Brittain
Attorney, Agent, or Firm—Harness, Dickey & Pierce

[57] ABSTRACT

A vehicle seat assembly is disclosed which includes an integral child seat that can be deployed for use in seating a child or maintained in a stowed position enabling the seat to be occupied by an adult. The seat assembly includes a pair of panels movably mounted to the seat back. When the side panels are moved outwardly, they extend forwardly from the seat back forming side bolsters for the child seat. Troughs are revealed adjacent to the side bolsters which contain the shoulder belts of the child restraint system. The child seat back cushion is disposed between the two troughs and is comprised of the same seat back surface as used by an adult when seated in the seat assembly. As a result of using the same seat back surface for both the child seat and an adult, the seating comfort of the adult seat back is maintained at the same level as with a conventional seat assembly not having an integral child seat.

14 Claims, 4 Drawing Sheets

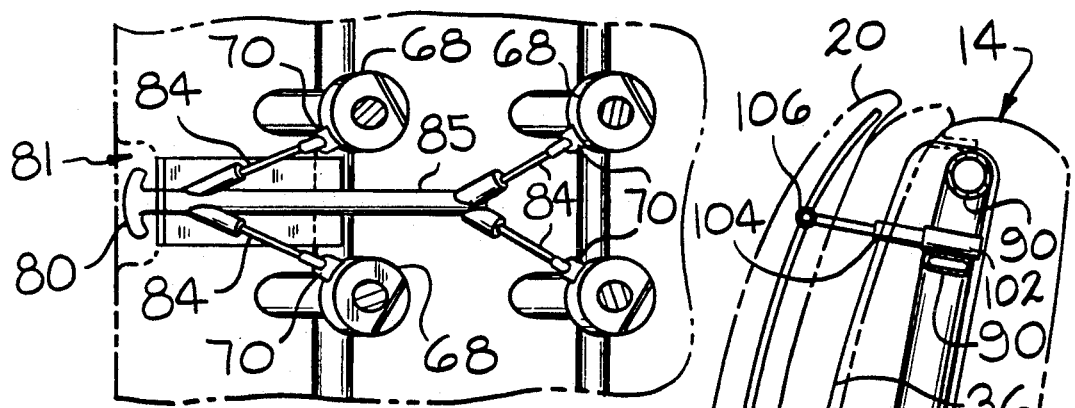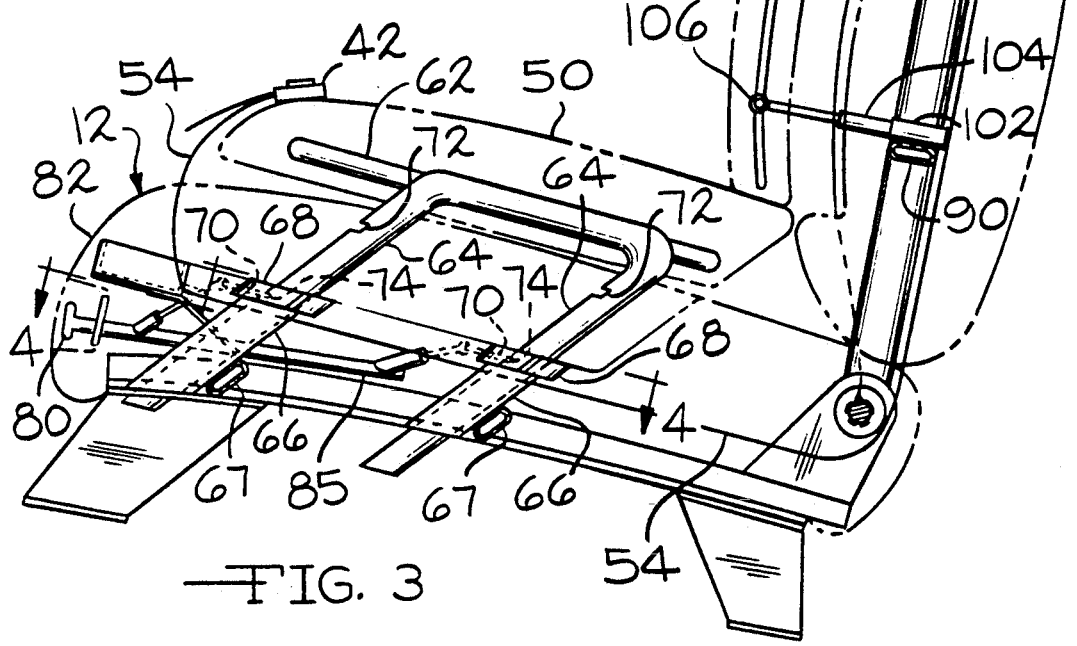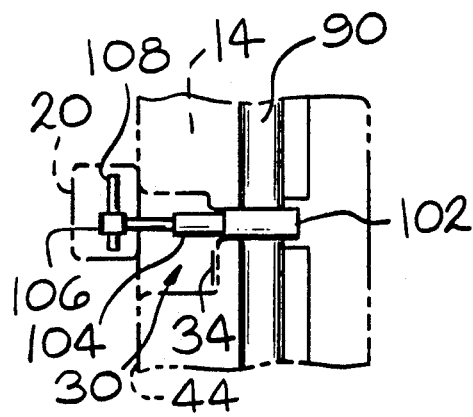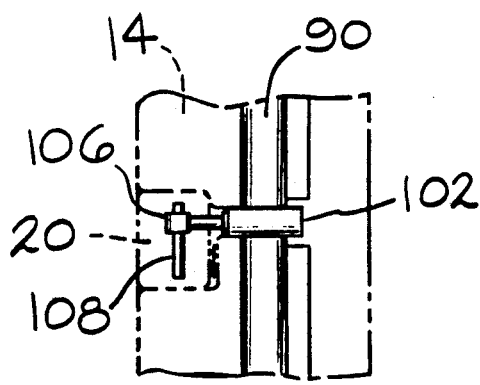

VEHICLE SEAT ASSEMBLY WITH INTEGRATED CHILD SEAT

BACKGROUND AND SUMMARY OF THE INVENTION

The present invention relates to a vehicle seat assembly and in particular to a seat assembly having an integral child seat therein. The child seat is conveniently stored within the seat assembly, enabling the seat assembly to be used by an adult passenger. When desired, the child seat can be deployed for use in providing a seat for a small child.

Several seat assemblies have been developed or proposed having an integrated child seat therein in which one or more panels in a seat back or seat cushion are rotatable about generally horizontal axes extending laterally across the seat assembly. The panels rotate between stowed and use positions. One typical feature of such seat assemblies is that when the child seat is deployed, the seat back and seat cushion surfaces of the child seat are different from the seat back and seat cushion surfaces of the adult seat. The result of such a structure is that the adult seat is typically of reduced foam thickness, and hence reduced comfort, compared to a seat not including an integral child seat. In addition, two seating surfaces are needed, one for adults and one for children, with the resultant need for additional cover material.

Accordingly, it is an object of the present invention to provide an integral child seat in which the child seating surfaces are the same surfaces as used for an adult.

It is an advantage of the present invention that the reduction in adult seating comfort can be minimized in a seat assembly having an integral child seat.

The seat assembly of the present invention accomplishes the above objective by forming the child seat with a pair of side panels adjacent the upright sides of the child seat back that are movable from a stowed position, in which the panels form a portion of the adult seat cushion, to a forwardly extending position in which the panels serve as side bolsters along the sides of the child seat. Once moved to the use position, a trough is revealed in the seat back adjacent to each side bolsters, in which is stored the shoulder belts of the child seat restraint system. Between the two shoulder belts of the restraint system is the child seat back surface which is the same surface used by the adult seat occupant when the child seat is not in use.

The child seat assembly further includes a seat cushion which is movable from a stowed position, in which the child seat cushion serves as a portion of the adult seat cushion, to a raised position forming a booster seat for a child seat occupant. The movable portion of the adult seat cushion is preferably a forward section that is moved upward and rearward, into engagement with the seat back surface. This forms a cavity at the front edge of the child seat cushion which can form a footrest for a child seat occupant. Again, the child seat cushion is the same surface as that used for an adult.

Further objects, features and advantages of the invention will become apparent from a consideration of the following description and the appended claims when taken in connection with the accompanying drawings.

BRIEF DESCRIPTION OF THE DRAWINGS

FIG. 3 is a side elevational view showing the structure of the seat assembly;

FIG. 4 is a sectional view as seen from substantially the line 4—4 of FIG. 3;

FIG. 5 is a plan view of the seat back mechanism showing the child seat in the stowed position;

FIG. 6 a view similar to FIG. 5 showing the child seat in the use position;

DETAILED DESCRIPTION OF THE INVENTION

Figure 1:
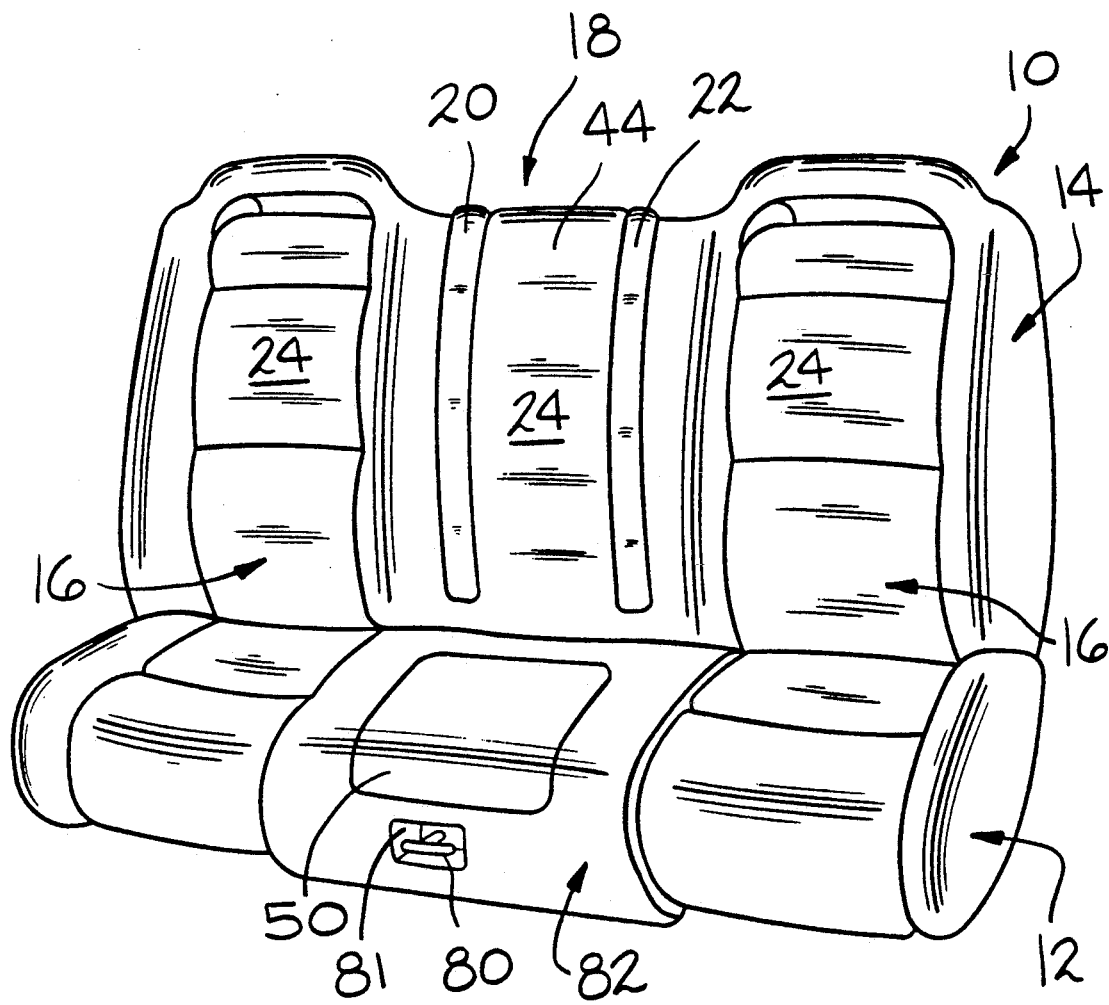
FIG. 1 is a perspective view of a seat assembly containing the integral child seat of the present invention shown in a stowed position.

The seat assembly of the present invention, including an integral child seat, is shown in FIG. 1 and designated generally at 10. Seat assembly 10 is a bench seat having a lower seat cushion 12 and a generally upright seat back 14. The seat back 14 extends generally upwardly from the rear of the seat cushion 12. Seat assembly 10 includes left and right adult seats 16 with a center portion 18 that can be used as a third adult seat. The center portion 18 includes the integral child seat which is in a stowed position in FIG. 1. The child seat can be deployed as shown in FIG. 2 for use in providing a seat for a small child or toddler.

Figure 2:
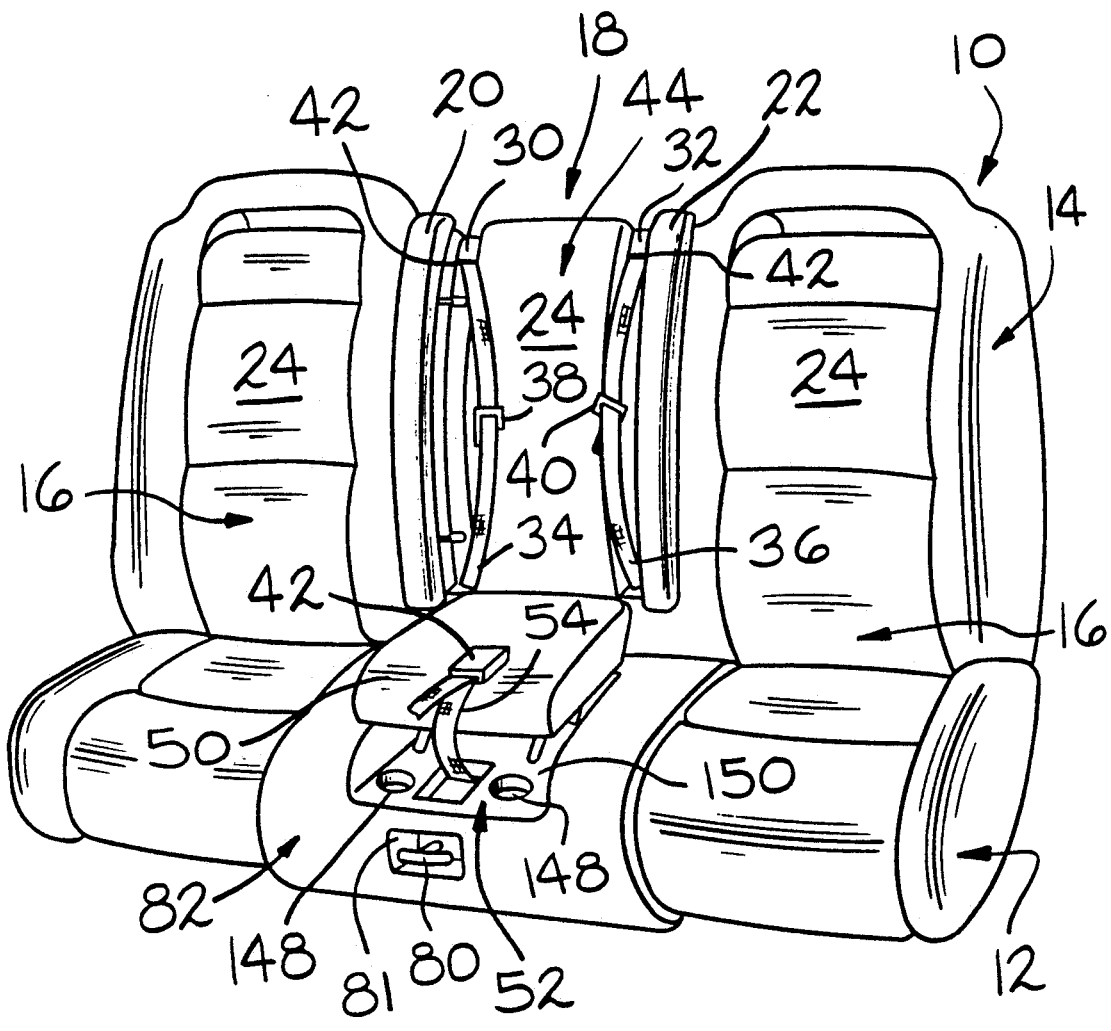
FIG. 2 is a perspective view similar to FIG. 1 showing the integral child seat in a deployed use position.

In the embodiment shown in FIGS. 1 and 2, the seat back 14 is formed with two movable panels 20, 22. In the stowed positions shown in FIG. 1, the panels 20, 22 form a portion of the seat back surface 24. When the panels are moved out of the seat back, the panels extend forward from the surface 24, forming side bolsters for the child seat. In the deployed use position shown in FIG. 2, troughs 30, 32 are revealed adjacent to the side panels 20, 22 respectively. The troughs contain shoulder belts 34, 36 of the child restraint system. The shoulder belts 34, 36 each carry a latch plate 38, 40, respectively, for insertion into a buckle 42. The shoulder belts extend through openings 42 in the seat back, and are coupled to the seat back frame. The lower end of the shoulder belts extend into the seat back and are attached to the seat back frame.

The child seat back 44, between the two troughs 30 and 32 forms the seat back of the child seat and is also a portion of the seat back surface for an adult when seated in the center portion 18 of the seat assembly 10. As a result, the padding and upholstery of the child seat back 44 is the same as used for an adult with no additional structural components being positioned in the child seat back 44 that would compromise the comfort for an adult seat occupant.

A child booster seat is formed by raising a child seat cushion 50 from a stowed position in the adult seat cushion 12 shown in FIG. 1. The child seat cushion 50 is raised and moved rearwardly from its stowed position to a use position in which it forms a raised booster seat for a child seat occupant. Once raised, a buckle 42 can be removed from a cavity 52 beneath the raised seat cushion. Buckle 42 is attached with a strap 54 that extends through the seat cushion behind the seat back frame 90 where it is connected to the shoulder belts 34, 36.

With reference to FIGS. 3 and 4, the mechanism for raising the child seat cushion 50 is shown in greater detail. The seat cushion is formed with a lower support plate 62 to which a plurality of support legs 64 are attached. Each of the support legs is slidably movable within a locking sleeve 66 mounted to the lower seat frame 67 to enable the seat cushion to be raised and lowered. Each of the locking sleeves 66 includes a latch 68 with a spring biased latch plate 70. The latch plates engage the support legs 64 and ar seated into upper detent notches 72 when the seat cushion is in the lowered stowed position and are seated in lower detent notches 74 when the seat cushion 50 is in the raised position. The latches thus hold the seat cushion 50 in either the raised or the lowered positions.

A handle 80 is located in a cavity 81 in the front face 82 of the seat cushion 12 to release the latches 68. Pull wires 84, extending through tube 85 connect the latch plates 70 to handle 80. By pulling forward on the handle 80, each of the latches are released, enabling the seat cushion 50 to be either raised or lowered.

With reference to FIGS. 5 and 6, the mechanism for moving the seat back panels 20, 22 is shown in greater detail. The seat back 14 includes a frame 90 which provides the structural support for the seat back. For each of the panels 20, 22, a pair of bushings 1 02 are mounted to the frame 90 and carry telescoping tubes 104. The panels are moved from the stowed position to the use position by first pulling the panels forward out of the seat back by extension of the telescoping tubes 104. Once the panels are moved forwardly on the front surface 24 of the seat back, the panels are moved laterally away from the child seat back 44. The lateral movement is provided by a slide block 106 movable on the frame 108 of the panels 20, 22. The two step motion of the panel in this manner enables the panels and seat cushion to be curved as shown in FIG. 3 and be able to move out of the seat back and laterally away from each other.

Figure 7:
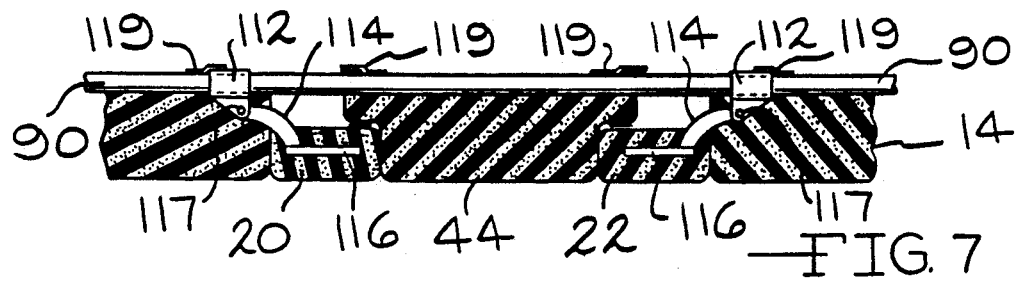
FIGS. 7 and 8 are plan views similar to FIGS. 5 and 6 respectively of an alternative embodiment of the seat back.
Figure 8:
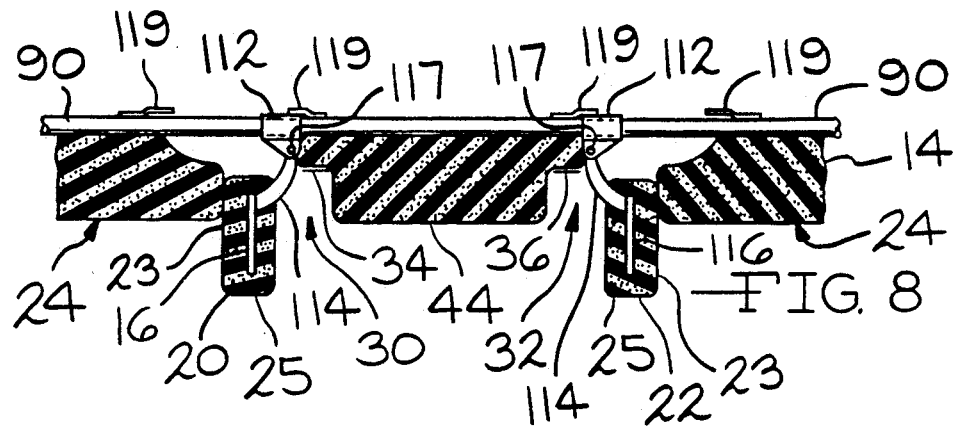

An alternative embodiment of the mechanism moving the panels 20, 22 is shown in FIGS. 7 and 8. In this embodiment, top and bottom slide blocks 112 are provided for each panel that slide laterally on the seat back frame 90. A hinge arm 114 mounts the frame 116 of the panels to the slide blocks 112. The panels are rotated out of the seat back to the use position. During rotation of the panels, the slide blocks 112 move from an outboard position shown in FIG. 7 to an inboard position shown in FIG. 8. The hinge arms rotate about pivot pins 117 of the slide blocks. The movement of the slide blocks results in a lateral movement of the pivot axe for the panels. This enables the panels to move from the stowed to use positions while maintaining an attractive tight fit with the seat back when in the closed position. Stops 119 are mounted to the frame 90 to limit travel of the slide blocks 112.

With rotating panels 20, 22, it is necessary that the panels and seat back be substantially straight. This allows both the face 23 and edge 25 of the panels to be parallel with the seat back when the panels are in the stowed and use positions respectively. This is in contrast to the curved panels shown in FIGS. 1 and 2 that are moved in a two step process so that the face surface 23 is facing forward in both the stowed and use positions and parallel with the seat back curved surface.

Figure 9:
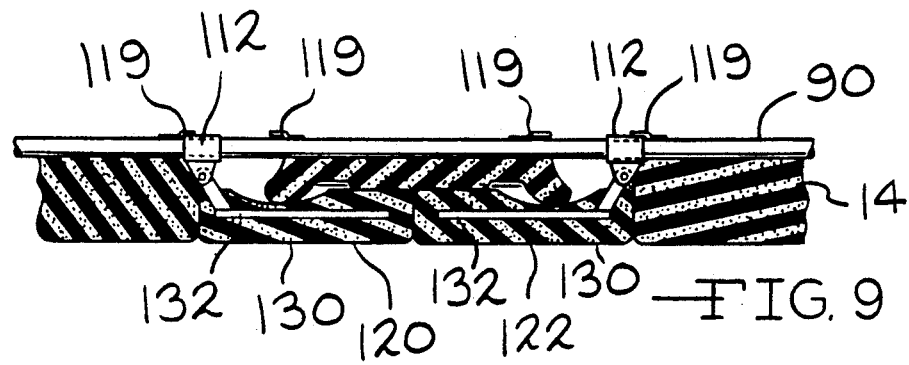
FIGS. 9 and 10 are views similar to FIGS. 5 and 6 showing yet another alternative embodiment of the seat back.
Figure 10:
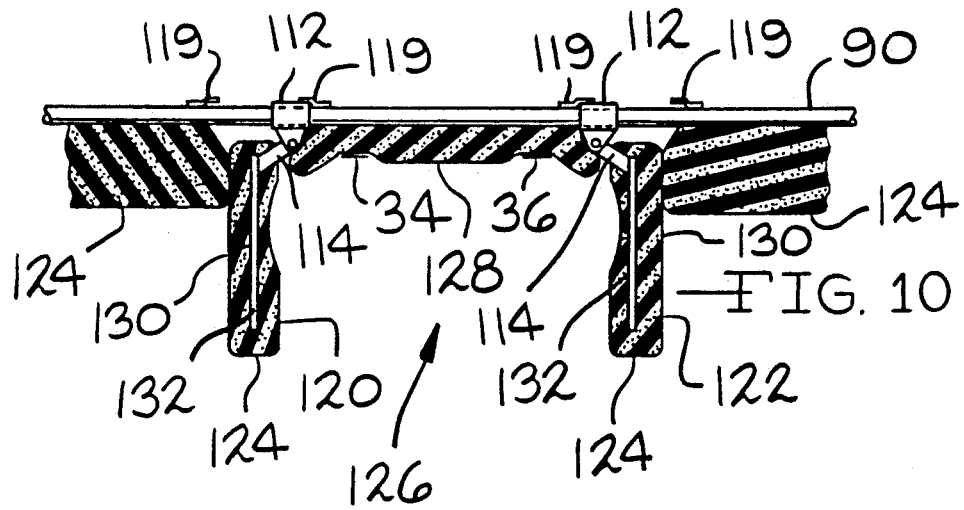

An alternative embodiment of the seat back is shown in FIGS. 9 and 10. The panels 120, 122 are mounted to the frame 90 of seat back frame 14 in the same manner as in the previously described embodiment shown in FIGS. 7 and 8. The panels 120, 122 are wider than panels 20, 22, such that in the closed position, the inner edges 124 of the panels contact one another. When the panels are folded out, a single large recess 126 is formed which serves as the seat back for the child seat. This embodiment provides a larger side bolster for the child seat. However, with the recessed child seat back surface 128, the comfort of both the adult seat cushion seat back and the child seat back is compromised. When the panels are in the stowed position shown in FIG. 9, less padding is provided between the face surface 130 of the adult seat back and the structural plates 132 of the panels 120, 122. This results in decreased comfort of the seat when occupied by an adult.

When the child seat is not in use, the seat cushion 50 can be raised and serve as an armrest for adults seated to the right or left of the child seat. Recesses 148 can be formed in the surface 150 below the seat cushion 50 to serve as holders for beverage containers used by adults in the adjacent seats.

The seat assembly of the present invention, having an integral child seat, uses the same seat cushion surface for both an adult and a child. In the preferred embodiments of the seat back, the same surface is also used for an adult and a child. As a result, seating comfort is improved.

It is to be understood that the invention is not limited to the exact construction illustrated and described above, but that various changes and modifications may be made without departing from the spirit and scope of the invention as defined in the following claims.

We claim:

1. A seat assembly for a motor vehicle having an integral child seat therein comprising:
    an adult seat cushion;
    an adult seat back extending upwardly at a rear of said adult seat cushion and including a seat back frame and seat back cushion, said seat back cushion forming a seat back surface;
    right and left panels forming a portion of the adult seat back cushion, each panel being movably mounted to said seat back cushion, said panels being laterally spaced from one another with a portion of said seat back cushion and said seat back surface being disposed therebetween;
    said panels having stowed positions in which a face surface of said panels forms a portion of said seat back surface upon which an adult seat occupant rests, said panels being movable forwardly from said seat back and laterally away from one another to use positions whereby said portion of said seat back surface between said panels forms a seat back for a child seat;
    means for raising a portion of said seat cushion forward of said child seat back from a stowed position, in which said portion forms a part of said adult seat cushion, to a raised use position above said adult seat cushion in which said portion forms a child seat cushion for a child occupant above said adult seat cushion; and
    restraint means for holding a child occupant seated upon said raised child cushion.

2. The seat assembly of claim 1 wherein said means for raising a portion of said seat cushion includes latch means for holding said seat cushion in said raised position; and manual release means for releasing said latch means to lower said portion of said seat cushion from said use position.

3. The seat assembly of claim 2 wherein said manual release means is accessible at a front surface of said adult seat cushion below said movable seat cushion portion.

4. The seat assembly of claim 1 wherein when said panels are moved to said use positions, recessed troughs are revealed along opposite lateral edges of said child seat back; and said restraint means including a pair of shoulder straps for extension over the shoulders of a child seat occupant, one belt of said pair being disposed in each of said troughs.

5. The seat assembly of claim 1 wherein said seat cushion portion is moved upwardly and rearwardly from the stowed position to the use position revealing a cavity in said adult seat cushion forwardly of said raised child seat cushion.

6. The seat assembly of claim 5 wherein said restraint means includes a buckle assembly having a stowed position within said cavity in said adult seat cushion when not in use.

7. The seat assembly of claim 1 comprising:

first moving means for moving said panels forward from said stowed position to an intermediate position forward of said seat back; and second moving means for moving said panels from said intermediate position laterally away from one another to said use positions in which a portion of said panels overlay a portion of said adult seat back.

8. The seat assembly of claim 7 wherein said first moving means comprises a telescoping tube mounted to said seat back frame; and said second moving means comprises a slide block mounted to said telescoping tube and a panel frame member slidably carried by said slide block for lateral movement.

9. A seat assembly for a motor vehicle having an integral child seat therein comprising:

an adult seat cushion;

an adult seat back extending upwardly at a rear of said adult seat cushion and including a seat back frame and seat back cushion;

right and left panels having a structural plate frame surrounded by padding forming a portion of said adult seat back cushion, each panel being rotatably mounted to said seat back cushion about a respective pivot axis extending upwardly generally parallel with said seat back, said panels being rotatable forwardly from said seat back and laterally away from one another;

said panels having a stowed position in which a face surface of each panel forms a portion of a face surface of said seat back cushion upon which an adult seat occupant rests, said panels being rotatable about said respective axes to use positions in which said panels extend forwardly from said seat back face surface;

a child seat cushion movably disposed in said adult seat cushion forwardly, of said child seat back;

means for guiding movement of said child seat cushion as said child seat cushion is moved from a stowed position in which said child seat cushion forms a portion of said adult seat cushion to a raised position in which said child seat cushion is raised above said adult seat cushion, said guide means guiding said child seat cushion along a straight line path to said raised position upward and rearward from said stowed position; and restraint means for holding a child occupant in said child seat.

10. The seat assembly of claim 9 wherein said panels are laterally spaced from one another with a portion of seat back between said panels forming said child seat back.

11. The seat assembly of claim 9 wherein said panels are adjacent one another when in said stowed position, said panels when moved to the use position revealing a child seat back disposed behind the adult seat back.

12. The seat assembly of claim 9 further comprising means for laterally moving said respective pivot axes as said panels are moved between said stowed and use positions.

13. The seat assembly of claim 12 wherein said means for laterally moving said respective axes includes slide block means mounted to said seat back frame and slidable laterally and pivot means for rotatably mounting said panels to said slide block means.

14. The seat assembly of claim 13 further comprising stop means secured to said seat back frame to limit lateral sliding of said slide block means.

* * * * *